United States Patent
Dahod et al.

(10) Patent No.: US 8,626,138 B2
(45) Date of Patent: Jan. 7, 2014

(54) PROVIDING ADVANCED COMMUNICATIONS FEATURES

(75) Inventors: Ashraf M. Dahod, Andover, MA (US); Michael Silva, East Sandwich, MA (US); Peter Higgins, Sandwich, MA (US); Rajat Ghai, Sandwich, MA (US); John DePietro, Sandwich, MA (US); Nick Lopez, Sleepy Hollow, IL (US); Paul Shieh, Westborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 12/119,354

(22) Filed: May 12, 2008

(65) Prior Publication Data

US 2008/0298309 A1 Dec. 4, 2008

Related U.S. Application Data

(63) Continuation of application No. 10/210,897, filed on Aug. 1, 2002, now Pat. No. 7,372,826.

(51) Int. Cl.
| | |
|---|---|
| *H04M 1/68* | (2006.01) |
| *H04M 3/42* | (2006.01) |
| *H04B 15/00* | (2006.01) |
| *H04B 7/00* | (2006.01) |
| *H04M 1/00* | (2006.01) |
| *H04W 4/00* | (2009.01) |
| *H04B 7/216* | (2006.01) |
| *H04L 12/66* | (2006.01) |
| *H04L 12/28* | (2006.01) |
| *H04J 3/06* | (2006.01) |

(52) U.S. Cl.
USPC ........ 455/416; 455/411; 455/426.1; 455/434; 455/501; 455/517; 455/556.1; 370/331; 370/338; 370/342; 370/352; 370/401; 370/503

(58) Field of Classification Search
USPC .......... 370/328, 338, 331, 345, 434; 455/411, 455/434, 456.4, 501, 50
See application file for complete search history.

(56) References Cited

U.S. PATENT DOCUMENTS

| | | | |
|---|---|---|---|
| 4,677,656 A | 6/1987 | Burke et al. | |
| 5,513,181 A | 4/1996 | Bresalier et al. | |
| 5,634,196 A | 5/1997 | Alford | |

(Continued)

FOREIGN PATENT DOCUMENTS

| | | |
|---|---|---|
| EP | 0650284 | 4/1995 |
| EP | 0845894 | 6/1998 |

(Continued)

OTHER PUBLICATIONS

Schulzrinne, H. "The Session Initiation Protocol," http://www.cs.columbia.edu/~coms6181/slides/11/sip_long.pdf, May 2001.

(Continued)

*Primary Examiner* — Inder Mehra
(74) *Attorney, Agent, or Firm* — Wilmer Cutler Pickering Hale and Dorr LLP

(57) ABSTRACT

Advanced communications features are provided in a mobile communications network having at least one mobile switching center and at least one mobile station subsystem. The mobile switching center and mobile station subsystem each communicate signaling messages according to a mobile signaling protocol.

18 Claims, 13 Drawing Sheets

(56) References Cited

U.S. PATENT DOCUMENTS

| | | | |
|---|---|---|---|
| 5,717,830 | A | 2/1998 | Sigler et al. |
| 5,838,748 | A | 11/1998 | Nguyen |
| 6,112,083 | A | 8/2000 | Sweet et al. |
| 6,128,509 | A | 10/2000 | Veijola et al. |
| 6,131,121 | A | 10/2000 | Mattaway et al. |
| 6,298,058 | B1 | 10/2001 | Maher et al. |
| 6,366,782 | B1 | 4/2002 | Fumarolo et al. |
| 6,400,967 | B1 | 6/2002 | Nilsson |
| 6,438,385 | B1 * | 8/2002 | Heinonen et al. ............ 455/501 |
| 6,449,496 | B1 | 9/2002 | Beith et al. |
| 6,477,150 | B1 | 11/2002 | Maggenti et al. |
| 6,542,933 | B1 * | 4/2003 | Durst et al. ................. 709/229 |
| 6,570,871 | B1 | 5/2003 | Schneider |
| 6,606,305 | B1 | 8/2003 | Boyle et al. |
| 6,754,180 | B1 | 6/2004 | Christie |
| 6,760,343 | B1 * | 7/2004 | Krishnamurthy et al. .... 370/466 |
| 6,778,521 | B1 * | 8/2004 | Korpela et al. ............... 370/345 |
| 7,058,036 | B1 | 6/2006 | Yu et al. |
| 7,826,603 | B1 * | 11/2010 | Denman et al. ......... 379/202.01 |
| 2001/0046234 | A1 | 11/2001 | Agrawal et al. |
| 2002/0075805 | A1 | 6/2002 | Gupta et al. |
| 2002/0075814 | A1 | 6/2002 | Desai et al. |
| 2002/0075875 | A1 | 6/2002 | Dravida et al. |
| 2002/0077136 | A1 | 6/2002 | Maggenti et al. |
| 2002/0078464 | A1 | 6/2002 | Dravida et al. |
| 2002/0085552 | A1 | 7/2002 | Tandon |
| 2002/0085589 | A1 | 7/2002 | Dravida et al. |
| 2002/0086665 | A1 | 7/2002 | Maggenti et al. |
| 2003/0017836 | A1 | 1/2003 | Vishwanathan et al. |
| 2003/0059035 | A1 * | 3/2003 | Nebiker et al. ......... 379/399.01 |
| 2003/0063590 | A1 * | 4/2003 | Mohan et al. ................ 370/338 |
| 2003/0088421 | A1 | 5/2003 | Maes et al. |
| 2003/0128696 | A1 | 7/2003 | Wengrovitz et al. |
| 2003/0156688 | A1 | 8/2003 | McCarty et al. |
| 2003/0185202 | A1 | 10/2003 | Maenpaa |
| 2005/0286689 | A1 | 12/2005 | Vuori |
| 2006/0002358 | A1 | 1/2006 | Ray et al. |
| 2006/0140151 | A1 * | 6/2006 | Dantu et al. .................. 370/331 |
| 2007/0253389 | A1 * | 11/2007 | Lucidarme et al. ........... 370/338 |
| 2010/0029251 | A1 * | 2/2010 | McConnell et al. .......... 455/413 |

FOREIGN PATENT DOCUMENTS

| | | |
|---|---|---|
| JP | 10233801 A | 9/1998 |
| WO | WO-98/47298 A2 | 10/1998 |
| WO | WO-00/22792 A2 | 4/2000 |
| WO | WO-00/47005 | 8/2000 |
| WO | WO-00/57601 | 9/2000 |
| WO | WO-00/79826 | 12/2000 |
| WO | WO-01/31939 A2 | 5/2001 |
| WO | WO-01/45335 | 6/2001 |
| WO | WO-01/56236 | 8/2001 |
| WO | WO-01/76276 A2 | 10/2001 |
| WO | WO-02/30010 | 4/2002 |
| WO | WO-02/45440 A1 | 6/2002 |
| WO | WO-02/054707 A2 | 7/2002 |

OTHER PUBLICATIONS

Handley, M. et al., "SIP Session Initiation Protocol," http:///tools.ietf.org/html/rfc2543, Mar. 1999.

ETSI Technical Report. "Trans European Trunked Radio (TETRA) System; Technical Requirements Specification Part 1: Voice Plus Data (V+D) Systems." European Telecommunications Standards Institute. Cedex, France. Jan. 1994. 69 pages.

* cited by examiner

PROVIDING ADVANCED COMMUNICATIONS FEATURES

CROSS-REFERENCE TO RELATED APPLICATIONS

This application is a continuation of U.S. patent application Ser. No. 10/210,897 filed on Aug. 1, 2002, which is hereby incorporated by reference herein in its entirety.

BACKGROUND

This invention relates to providing advanced communications features.

Wireless telecommunication systems are able to provide wireless versions of information services traditionally provided by land-line or copper wire systems. Examples of wireless communications applications include Advanced Mobile Phone Service (AMPS) analog cellular service and Code Division Multiple Access (CDMA) and Advanced Mobile Phone Service (AMPS-D) digital cellular service in North America, and Group Speciale Mobile (GSM) cellular service in Europe.

Although the particular application may vary, the components of a wireless communication system are generally similar, as described in more detail below. For example, a wireless communication system usually includes a radio terminal or mobile station, a radio base station, a switch or network control device, often referred to as a mobile telephone switching office (MTSO), and a network to which the wireless communications system provides access, such as the Public Switched Telephone Network (PSTN).

The various wireless communication applications use any of multiple modulation techniques for transmitting information to efficiently utilize the available frequency spectrum. For example, frequency division multiple access (FDMA), time division multiple access (TDMA), and code division multiple access modulation techniques are used to build high-capacity multiple access systems. Telecommunication systems designed to communicate with many mobile stations occupying a common radio spectrum are referred to as multiple access systems.

For example, in an FDMA analog cellular system, such as an AMPS analog cellular radio system, the available frequency spectrum is divided into a large number of radio channels, e.g., pairs of transmit and receive carrier frequencies, each of which corresponds to a message transmission channel. The bandwidth of each transmit and receive frequency channel is narrowband, generally 25-30 kHz. Thus, the FDMA system permits information to be transmitted in a bandwidth comparable to the bandwidth of the transmitted information, such as a voice signal. The cellular service area in the FDMA system is generally divided into multiple cells, each cell having a set of frequency channels selected so as to help reduce co-channel interference between cells.

Frequency division is often combined with time division so that transmission circuits are distinguished in both the frequency and time domain, e.g., in a FD/TDMA system. In a digital FD/TDMA (commonly referred to as TDMA) cellular system, a narrowband frequency channel is reformatted as a digital transmission path which is divided into a number of time slots. The data signals from different calls are interleaved into assigned time slots and sent out with a correspondingly higher bit rate, the time slot assigned to each mobile station being periodically repeated. Although the TDMA bandwidth may be somewhat larger than the FDMA bandwidth, a bandwidth of approximately 30 kHz is generally used for AMPS-D digital TDMA cellular systems.

Another approach to cellular multiple access modulation is CDMA. CDMA is a spread spectrum technique for transmitting information over a wireless communication system in which the bandwidth occupied by the transmitted signal is significantly greater than the bandwidth required by the baseband information signal (e.g., the voice signal). Thus, CDMA modulation spectrally spreads a narrowband information signal over a broad bandwidth by multiplex modulation, using a codeword to identify various signals sharing the same frequency channel. Recognition of the transmitted signal takes place by selecting the spectrally-coded signals using the appropriate codeword. In contrast to the narrowband channels of approximately 30 kHz used in FDMA and TDMA modulation techniques, a CDMA system generally employs a bandwidth of approximately 1.25 MHz or greater.

Typically, the mobile communication systems described above are arranged hierarchically such that a geographical "coverage area" is partitioned into a number of smaller geographical areas called "cells." Referring to FIG. 1, each cell is preferably served by a Base Transceiver Station ("BTS") 102a. Several BTS 102a-n are centrally administered via fixed links 104a-n by a Base Station Controller ("BSC") 106a. The BTSs and BSC are sometimes collectively referred to as the Base Station Subsystem ("BS") 107. Several BSCs 106b-n may be centrally administered by a Mobile Switching Center ("MSC") 110 via fixed links 108a-n.

MSC 110 acts as a local switching exchange (with additional features to handle mobility management requirements, discussed below) and communicates with the phone network ("PSTN") 120 through trunk groups. U.S. mobile networks include a home MSC and a serving MSC. The home MSC is the MSC corresponding to the exchange associated with a Mobile Subscriber (also referred to above as a mobile station or "MS"); this association is based on the phone number, such as the area code, of the MS. Examples of an MS include a hand-held device such as a mobile phone, a PDA, a 2-way pager, or a laptop computer, or Mobile Unit Equipment, such as a mobile unit attached to a refrigerator van or a rail car, a container, or a trailer.

The home MSC is responsible for a Home Location Register ("HLR") 118 discussed below. The serving MSC, on the other hand, is the exchange used to connect the MS call to the PSTN. Consequently, sometimes the home MSC and serving MSC functions are served by the same entity, but other times they are not (such as when the MS is roaming). Typically, a Visiting Location Register ("VLR") 116 is co-located with the MSC 110 and a logically singular HLR is used in the mobile network (a logically singular HLR may be physically distributed but is treated as a single entity). As will be explained below, the HLR and VLR are used for storing subscriber information and profiles.

Radio channels 112 are associated with the entire coverage area. As described above, the radio channels are partitioned into groups of channels allocated to individual cells. The channels are used to carry signaling information to establish call connections and related arrangements, and to carry voice or data information once a call connection is established.

Mobile network signaling has at least two significant aspects. One aspect involves the signaling between an MS and the rest of the network. In the case of 2G ("2G" is the industry term used for "second generation") and later technology, this signaling concerns access methods used by the MS (such as TDMA or CDMA), pertaining to, for example, assignment of radio channels and authentication. A second aspect involves the signaling among the various entities in the mobile network, such as the signaling among the MSCs, BSCs, VLRs, and HLRs. This second part is sometimes referred to as the Mobile Application Part ("MAP") especially when used in the context of Signaling System No. 7 ("SS7"). SS7 is a common channel signaling system by which elements of the telephone network exchange information, in the form of messages.

The various forms of signaling (as well as the data and voice communication) are transmitted and received in accordance with various standards. For example, the Electronics Industries Association ("EIA") and Telecommunications Industry Association ("TIA") help define many U.S. standards, such as IS-41, which is a MAP standard. Analogously, the CCITT and ITU help define international standards, such as GSM-MAP, which is an international MAP standard. Information about these standards is well known and may be found from the relevant organizing bodies as well as in the literature, see, e.g., Bosse, SIGNALING IN TELECOMMUNICATIONS NETWORKS (Wiley 1998).

To deliver a call from an MS 114, a user dials the number and presses "send" on a cell phone or other MS. The MS 114 sends the dialed number indicating the service requested to the MSC 110 via the BS 107. The MSC 110 checks with an associated VLR 116 (described below) to determine whether the MS 114 is allowed the requested service. The serving MSC routes the call to the local exchange of the dialed user on the PSTN 120. The local exchange alerts the called user terminal, and an answer back signal is routed back to the MS 114 through the serving MSC 110 which then completes the speech path to the MS. Once the setup is completed the call may proceed.

To deliver a call to an MS 114, (assuming that the call originates from the PSTN 120) the PSTN user dials the MS's associated phone number. At least according to U.S. standards, the PSTN 120 routes the call to the MS's home MSC (which may or may not be the MSC serving the MS). The MSC then interrogates the HLR 118 to determine which MSC is currently serving the MS. This also acts to inform the serving MSC that a call is forthcoming. The home MSC then routes the call to the serving MSC. The serving MSC pages the MS via the appropriate BS. The MS responds and the appropriate signaling links are set up.

During a call, the BS 107 and MS 114 may cooperate to change channels or BTSs 102, if needed, for example, because of signal conditions. These changes are known as "handoffs," and they involve their own types of known messages and signaling.

One aspect of MAP involves "mobility management." Different BSs and MSCs maybe needed and used to serve an MS, as the MS 114 roams to different locations. Mobility management helps to ensure that the serving MSC has the subscriber profile and other information the MSC needs to service (and bill) calls correctly. To this end, MSCs use VLR 116 and HLR 118. The HLR is used to store and retrieve the mobile identification number ("MIN"), the electronic serial number ("ESN"), MS status, and the MS service profile, among other things. The VLR stores similar information in addition to storing an MSC identification that identifies the home MSC. In addition, under appropriate MAP protocols, location update procedures (or registration notifications) are performed so that the home MSC of a Mobile Subscriber can locate its users. These procedures are used when an MS roams from one location to another or when an MS is powered on and registers itself to access the network. For example, a location update procedure may proceed with the MS 114 sending a location update request to the VLR 116 via the BS 107 and MSC 110. The VLR 116 sends a location update message to the HLR 118 serving the MS 114, and the subscriber profile is downloaded from the HLR 118 to the VLR 116. The MS 114 is sent an acknowledgement of a successful location update. The HLR 118 requests the VLR (if any) that previously held profile data to delete the data related to the relocated MS 114.

FIG. 2 shows in more detail the signaling and user traffic interfaces between a BS 107 and an MSC 110 in a CDMA mobile network. The BS 107 communicates signaling information using an SS7-based interface for controlling voice and data circuits known as the "A1" interface. An interface known as "A2" carries user traffic (such as voice signals) between the switch component 204 of the MSC and the BS 107. An interface known as "A5" is used to provide a path for user traffic for circuit-switched data calls (as opposed to voice calls) between the source BS and the MSC. Information about one or more of A1, A2, A5 may be found in CDMA Internetworking—Deploying the Open-A Interface, Su-Lin Low, Ron Schneider, Prentice Hall, 2000, ISBN 0-13-088922-9.

Mobile communications providers are supplying newer services, e.g., "data calls" to the Internet. For at least some of these services, MSCs are not cost effective because they were primarily designed for voice calls. Integration of new services into the MSC is difficult or infeasible because of the proprietary and closed designs used by many MSC software architectures. That is, the software logic necessary to provide the services is not easy to add to the MSC 110. Often, a switch adjunct is used to provide such services. For example, an Inter-Working Function ("IWF") is an adjunct to route a data call to the Internet. Either approach—integrating functionality into the MSC or adding a trunk-side adjunct—involves the MSC in the delivery of service. Integrating new services via MSC design changes or through trunk-side adjuncts can increase network congestion at the MSC and consume costly MSC resources.

Data calls typically make use of the Internet, which is an example of a packet-switching medium. A packet-switching medium operates as follows. A sequence of data is to be sent from one host to another over a network. The data sequence is segmented into one or more packets, each with a header containing control information, and each packet is routed through the network. A common type of packet switching is datagram service, which offers little or no guarantees with respect to delivery. Packets that may belong together logically at a higher level are not associated with each other at the network level. A packet may arrive at the receiver before another packet sent earlier by the sender, may arrive in a damaged state (in which case it may be discarded), may be delayed arbitrarily (notwithstanding an expiration mechanism that may cause it to be discarded), may be duplicated, and may be lost.

With respect to the Internet, multicast communication refers to the transmission of identical data packets to selected, multiple destinations on an Internet Protocol network. (In contrast, broadcast communication refers to the indiscriminate transmission of data packets to all destinations, and unicast communication refers to the transmission of data packets to a single destination.) Each participant in a multicast receives information transmitted by any other participant in the multicast. Users connected to the network who are not participants in a particular multicast do not receive the information transmitted by the participants of the multicast. In this way, the multicast communication uses only the network components (e.g., switches and trunks) actually needed for the multicast transmission.

In multicast processing, when a potential participant ("host") is directed to join a particular IP multicast group, the host sends a "request to join" message to the nearest multicast-capable router to request to join the multicast group and receive information sent to this group. For example, a host A sends a message to join multicast group Y, and a host B sends a message to join multicast group X. A router R propagates the request up to the multicast source if the data path is not already in place.

Upon receiving an IP packet for group X, for example, the router R maps an IP multicast group address into an Ethernet multicast address, and sends the resultant Ethernet packet to the appropriate switch or switches.

According to the Internet Group Management Protocol ("IGMP"), a host's membership in a multicast group expires when the router does not receive a periodic membership report from the host.

With respect to interaction among MSs, a Nextel service (known as Nextel Direct Connect®, using Specialized Mobile Radio technology, and described at http://www.nextel.com/phone_services/directconnect.shtml) having two versions has been proposed for special connection calls among MSs. Both versions of the special connection calls require special-purpose MSs. In the first version, a one to one conversation is allowed between two mobile telephone subscribers, e.g., A and B. When A wishes to have special connection communication with B, A enters B's private identification number, holds down a push to talk ("PTT") button, waits for an audible alert signifying that B is ready to receive, and starts speaking. To listen, A releases the PTT button. If B wishes to speak, B holds down the PTT button and waits for an audible confirmation that A is ready to receive. The service allows a subscriber to choose private identification numbers from scrollable lists displayed on mobile telephone handsets or to search a list of pre-stored names of subscribers.

In the second version, conversations are allowed among members of a pre-defined group of subscribers, known as a Talkgroup, which is identified by a number. The mobile telephone handset may allow Talkgroup numbers to be searched through the control surface of the handset. In order to place a group call, the initiating subscriber, e.g., A, locates a Talkgroup number in the handset, holds down the PTT button, and, upon receiving an audible confirmation such as a chirp, can start speaking. All of the other Talkgroup members on the group call can only listen while A is holding down the PTT button. If A releases the PTT button, another member on the group call may hold down the PTT button, acquire control signaled by the audible confirmation, and start speaking.

Technology on the Internet includes instant text messaging (IM), which lets users receive text messages moments after the messages are sent. IM provides a way to chat with friends and also provides a useful tool for business. IM provides the convenience of electronic mail (e-mail) and the immediacy of a telephone call. The text messages arrive in real time (or nearly so) because both parties are constantly connected to the network. Recipients receive messages as fast as the data can travel across the Internet. (E-mail is less immediate. E-mail technology sends messages to a server that stores the items until the messages are downloaded by the recipient's e-mail software.) When a user logs on to an IM service, the software lets a server know that the user is available to receive messages. To send a message to someone else, the user begins by selecting that person's name, usually from a contact list the user has built. The user then enters the message and clicks a "Send" button. A data packet is sent that contains address information for the recipient, the message, and data identifying the sender. Depending on the particular service, the server either directly relays the message to the recipient or facilitates a direct connection between the user and the recipient.

An IM service typically uses one of three mechanisms to transport messages: a centralized network, a peer-to-peer connection, or a combination of both a centralized network and a peer-to-peer connection. In the case of a centralized network (used by, e.g., MSN Messenger), users are connected to each other through a series of servers that are linked to form a large network. When a user sends a message, servers locate the recipient's computer station and route the message through the network until the message reaches its destination.

According to the peer-to-peer approach (used by, e.g., ICQ), a central server keeps track of which users are online and the users' unique Internet Protocol (IP) addresses. (An IP address identifies a computer, which allows the computer to send and receive data via the Internet.) After a user logs on, the server provides the user's computer with the IP addresses of each other user on the user's contact list who is currently logged on. When the user creates a message to send to another user, the user's computer sends the message directly to the recipient's computer, without involving the server. Messages traverse only the network portion between the sender's and recipient's computers, which speeds transfers by helping to avoid network traffic.

America Online, Inc. (AOL) supplies AOL Instant Messenger (AIM) which combines the centralized and peer-to-peer methods. When a user sends a text message, the message travels along AOL's centralized network. However, when the user sends a file, the users' computers establish a peer-to-peer connection.

In another variation of Internet technology, at least one wireless Internet system has been proposed that provides reliable access to tens of megahertz of bandwidth across a wide geographic area, using local wireless transceiver technology (e.g., in a nanocell system). In contrast to the cellular wireless voice system, which relies on tens or hundreds of cells in a region, the local wireless transceiver system relies on thousands or tens of thousands of transceivers in the region. In such a system, each transceiver may cover, e.g., 0.05 square kilometers, which is about one-hundredth the coverage of a conventional cell. High spatial reuse of the radio frequency (RF) spectrum allows the local wireless transceiver system to accommodate many more active devices at a given data rate than a conventional cell system. In addition, since users are closer to access points, the local wireless transceiver system accommodates lower-power transmissions. The local wireless transceiver system can support large numbers of devices, running at high speeds, with relatively little drain on the devices' batteries.

For example, in a citywide local wireless transceiver system network of 10,000 transceiver access points (cell centers), if each point provides its users with 1-Mb/s collective throughput, 10 active devices per transceiver can be supported at 100 kb/s each, which amounts to 100,000 active devices in the city. If each device is active 10 percent of the time, such a network can support a million devices, although some accounting would need to be made for bandwidth consumed by overhead for channel access, handoffs, and any provision for asymmetric traffic (e.g., in which more bits flow toward a device than from it).

Each local wireless transceiver system access point may be or resemble access points for wireless local area network (LAN) technology such as IEEE 802.11. An asynchronous digital subscriber line (ADSL), or a cable modem line may be used to provide a link between each access point and the Internet (a wireless link may be used as well or instead). With respect to the siting of access devices, since each device requires electrical power and is preferably elevated for adequate radio frequency coverage, sites on utility poles and buildings are typical candidates, with the high-speed neighborhood Internet access infrastructure serving as a backbone.

SUMMARY

Advanced communications features are provided in a mobile communications network having at least one mobile switching center and at least one mobile station subsystem. The mobile switching center and mobile station subsystem each communicate signaling messages according to a mobile signaling protocol.

In an aspect of the invention, an indication is received that a half-duplex mobile communications session is to be initiated between a first mobile station subsystem and a second mobile station subsystem. (As used herein, "half-duplex" refers to a session in which at most one MS at a time is considered a transmission source; "half-duplex" does not necessarily mean the sharing, alternating or otherwise, of any channel or medium for transmission and reception.) The first and second mobile station subsystems include full-duplex communications apparatus for use in full-duplex mobile communications sessions. The half-duplex mobile communications session relies on the first and second mobile station subsystems, and all of the reliance is only on the full-duplex communications apparatus. Mobile communications telephone calls are established with the first mobile station subsystem and the second mobile station subsystem. One of the first and second mobile station subsystems is selected as a voice signal source in the half-duplex communications session.

In another aspect of the invention, message data is derived from an audio signal originating at a mobile station subsystem. The message data is suitable for playback over a telephone system and constitutes a completed message. Based on an indication from the mobile station subsystem, a set of mobile station subsystem destinations is determined for the message data. For each of the mobile station subsystem destinations, it is determined whether the mobile station subsystem destination is ready to play back the message data. Each of the mobile station subsystem destinations includes real-time communications apparatus for use in real-time communications sessions. The readiness determination relies on the mobile station subsystem destinations. All of the reliance is only on the real-time communications apparatus.

Implementations of the invention may provide one or more of the following advantages. By supplying enhanced services that do not require new hardware at the user end, service providers can achieve additional revenue and profits with little or no investment of time or resources into changes at the user end. Users gain mobility, flexibility, and time efficiency by being able to make more use of voice input for user control and content entry, so that interaction with communications resources is less demanding on eyes and fingers. The user experience is improved over conventional offerings so that the stability and loyalty of the user base is improved.

Other advantages and features will become apparent from the following description, including the drawings, and from the claims.

DETAILED DESCRIPTION

An enhanced mobile communications system provides advanced communications features. As described below, the features may include a half-duplex mobile communications session (e.g., walkie-talkie style) between a first conventional MS and a second conventional MS, and/or an instant voice message system.

Figure 1:
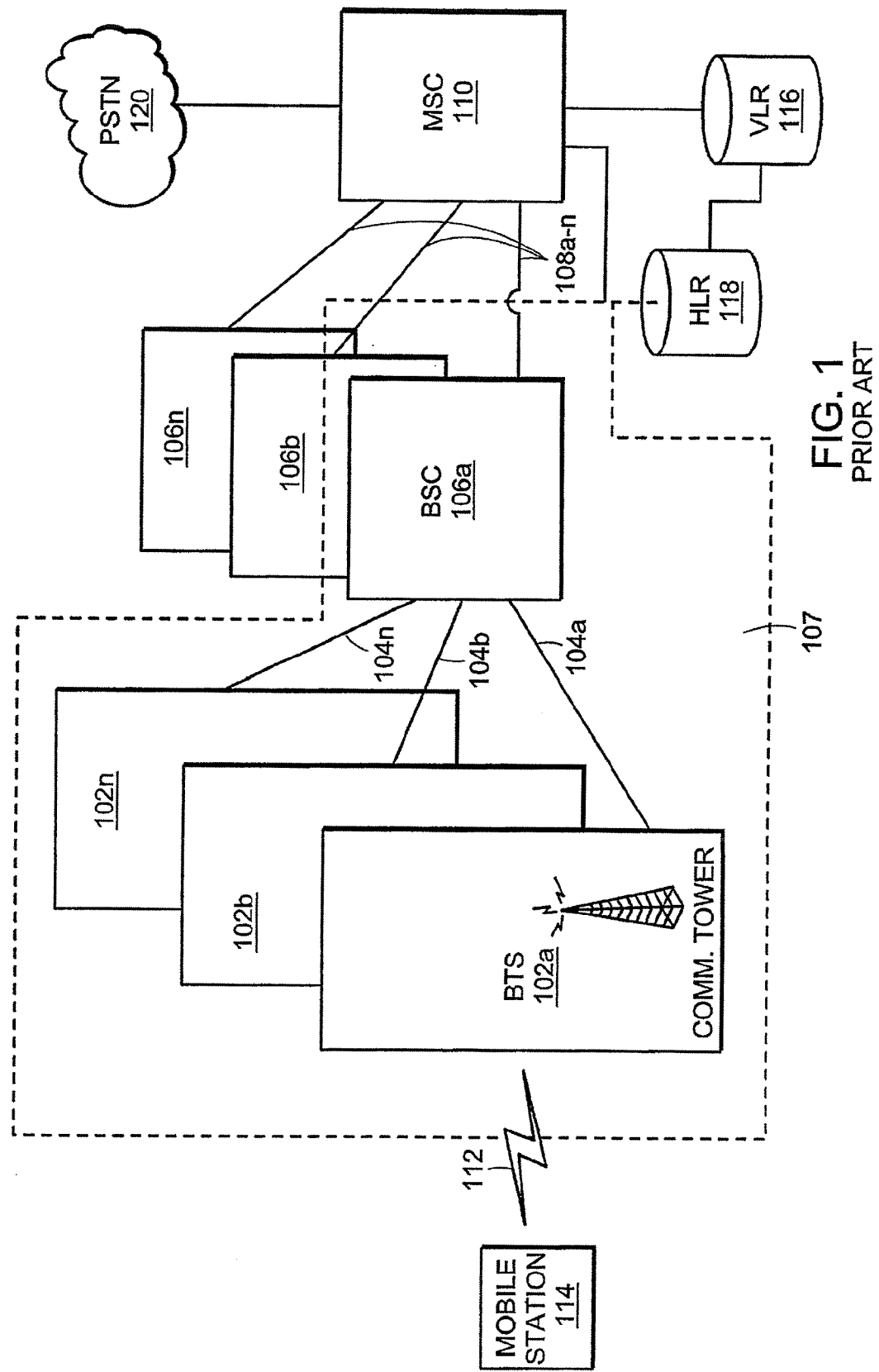
FIGS. 1-2, 3A-3B, 4, 6, 9-11 are block diagrams of communications systems.
Figure 2:
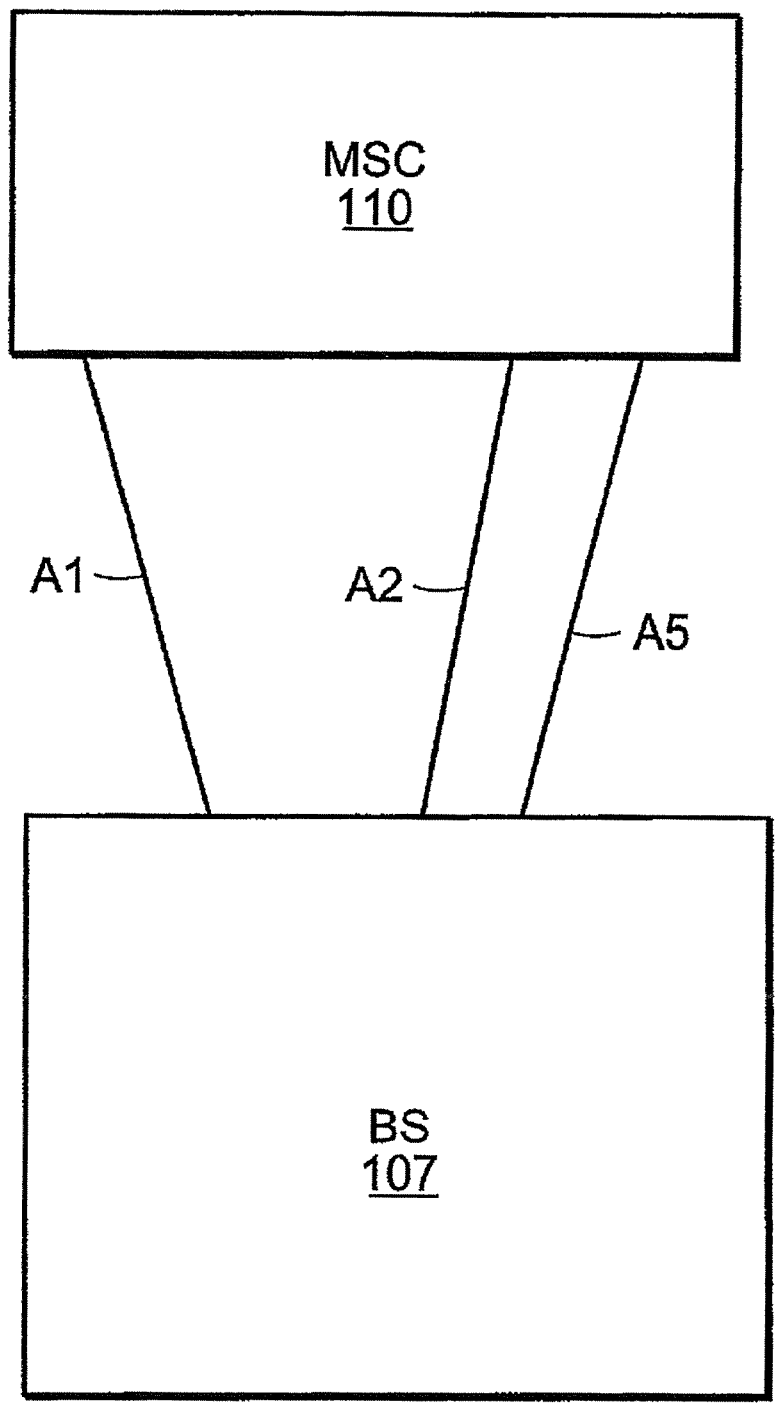
Figure 3A:
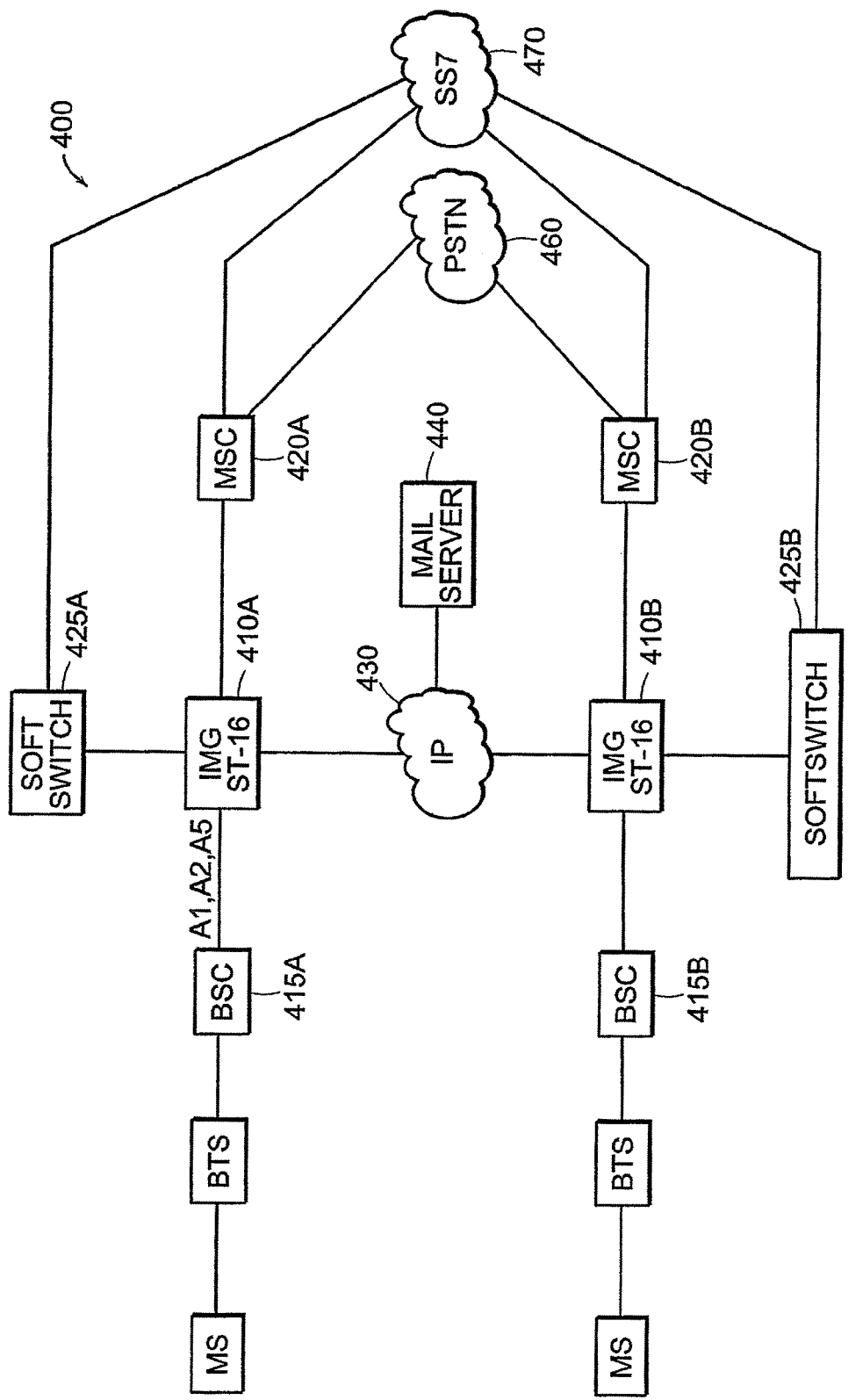
Figure 3B:
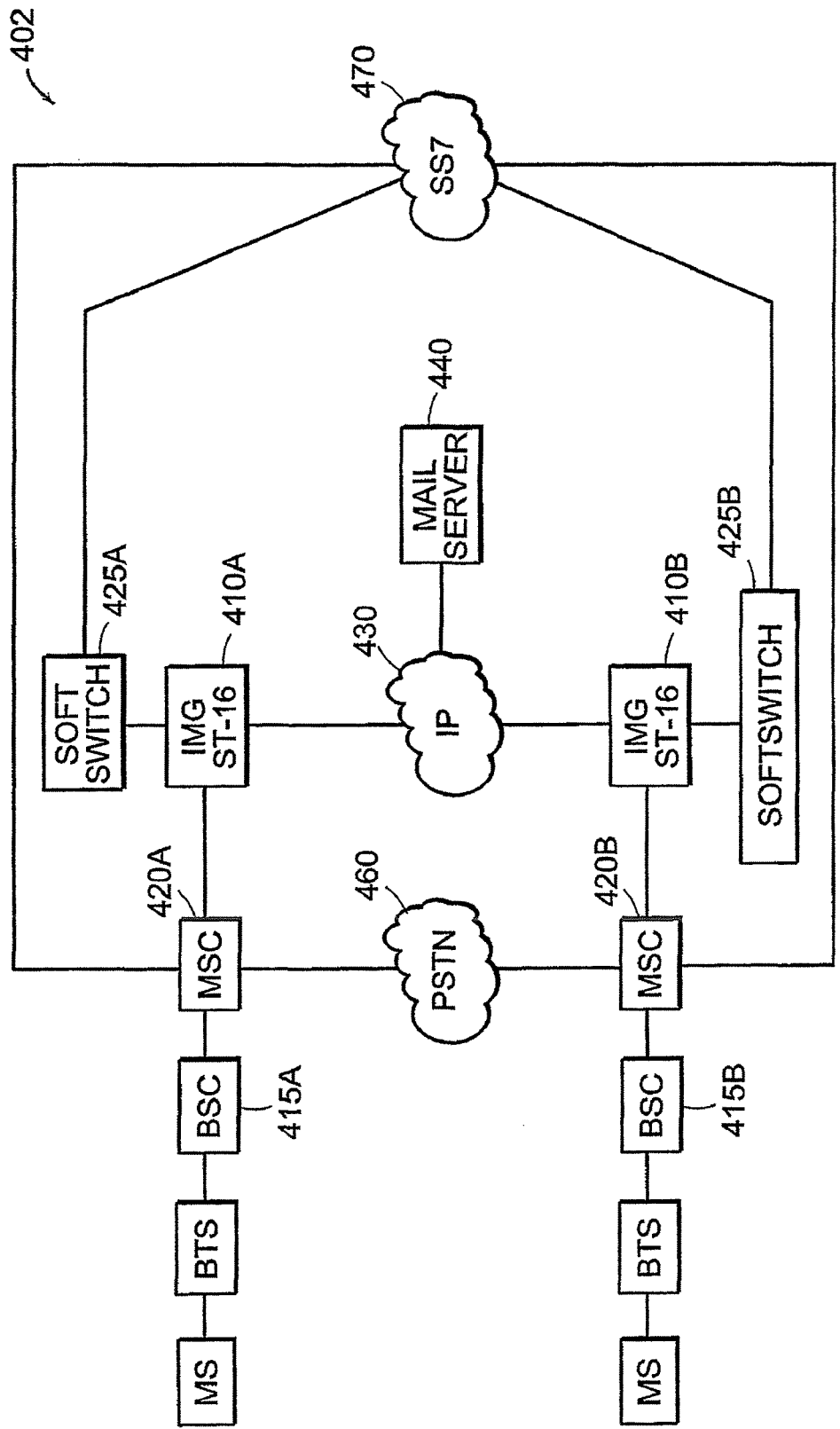

The enhanced mobile communications system has an Internet media gateway mechanism ("IMG") and a Softswitch mechanism that may be used as described below. FIG. 3A illustrates an example system 400 having an IMG 410A connected between BSC 415A and MSC 420A and communicating with a Softswitch 425A. IMG 410A communicates with BSC 415A by A1, A2, and A5 interfaces. As described below, Softswitch 425A coordinates pathway setup and communication between BSC 415A and MSC 420A through IMG 410A. IMG 410A also communicates with the Internet 430, through which IMG 410A is able to direct messages to a mail server 440, as described below. Other IMGs and Softswitches may be provided similarly in connection with other BSCs and MSCs as exemplified in FIG. 3A by IMG 410B, Softswitch 425B, BSC 415B, and MSC 420B. MSCs 420A, 420B are connected to, and can communicate with each other through, PSTN 460. SoftSwitches 425A, 425B are connected to, and can communicate with each other through, SS7 system 470. (FIG. 3B illustrates an alternative arrangement 402 in which MSC 420A is connected between IMG 410A and BSC 415A, and MSC 420B is connected between IMG 410B and BSC 415B.) The IMG, aided by the Softswitch, serves as a front end for a corresponding MS, providing the MS with access to enhanced features such as the features described below. In particular, the IMG allows a user of the MS to use the MS's conventional voice communication capabilities to interact with other users in enhanced ways.

Figure 4:
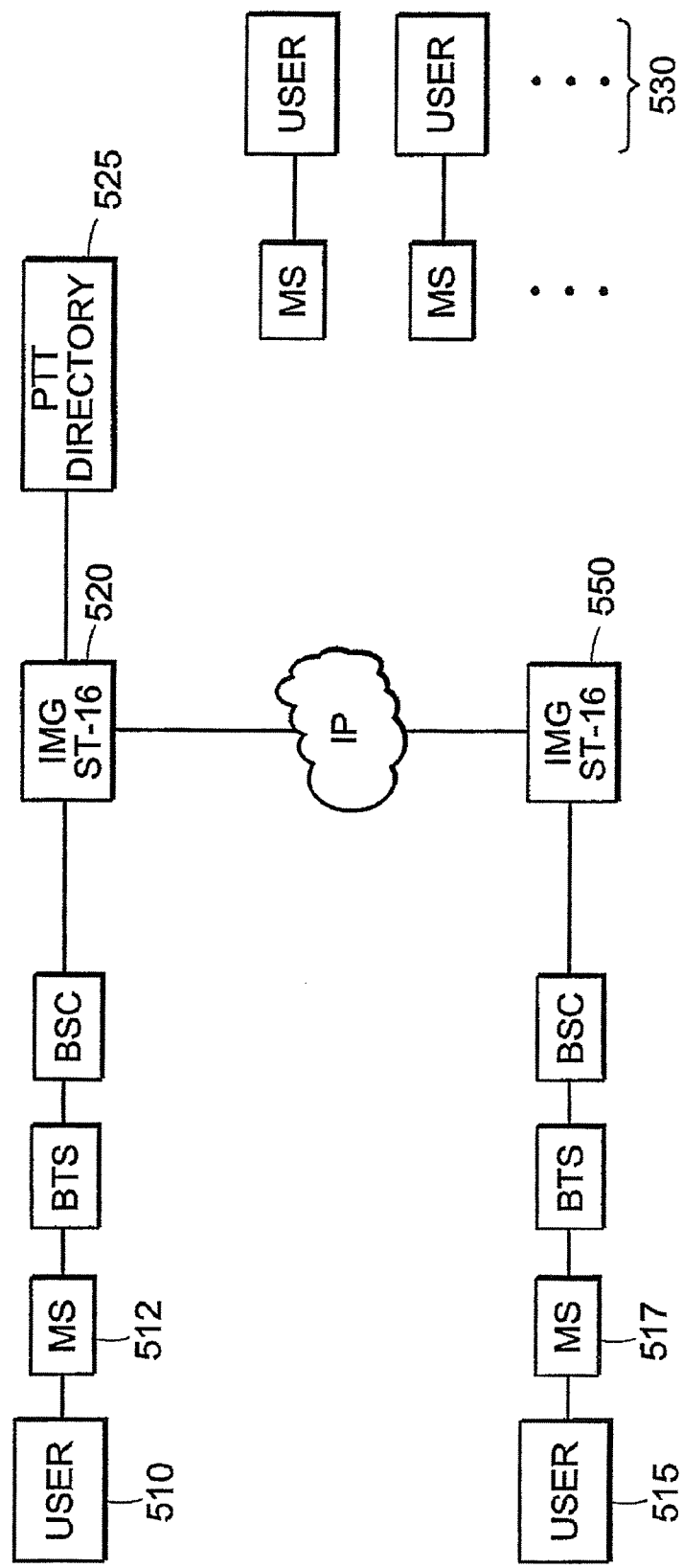
Figure 5:
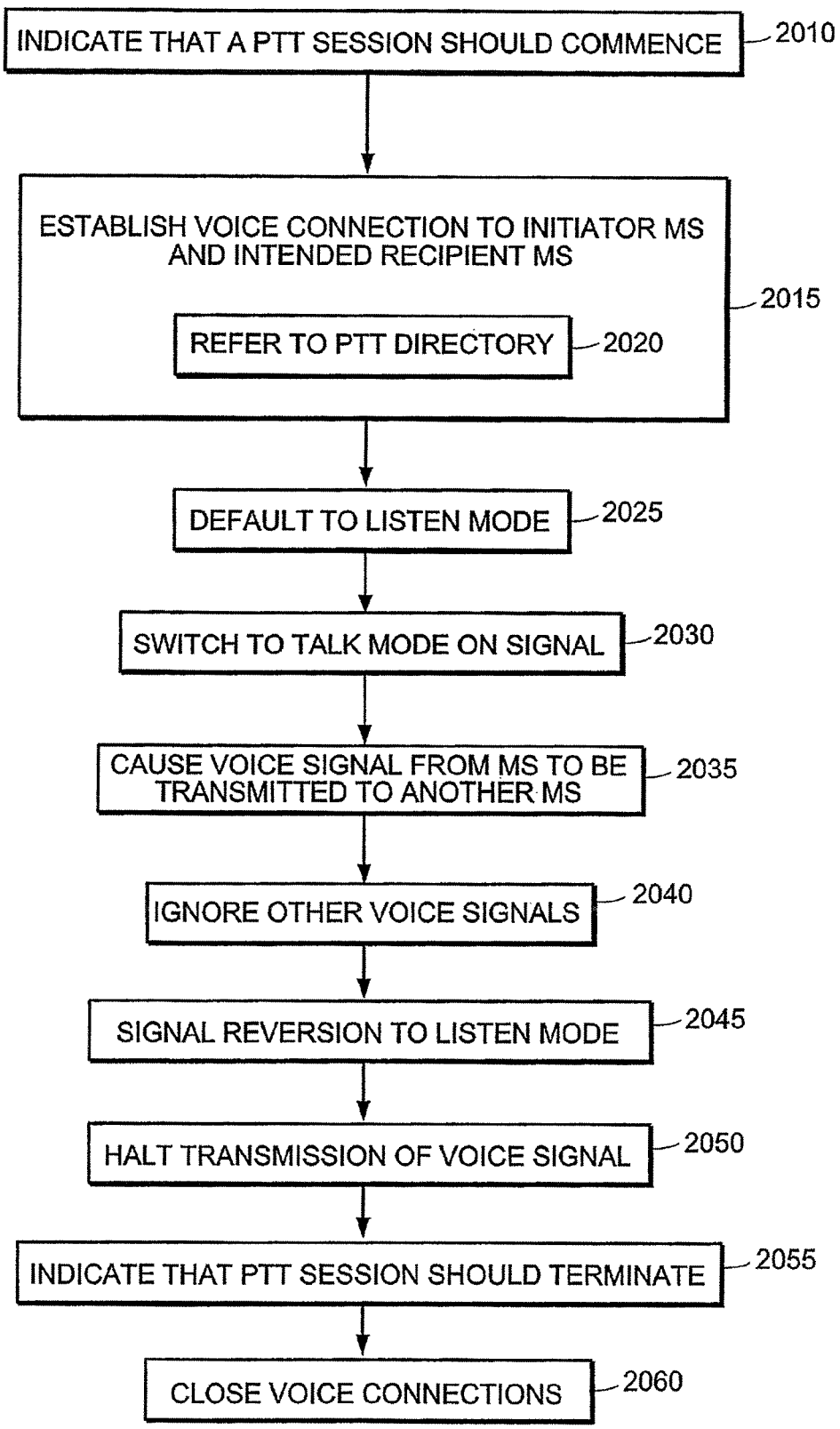
FIGS. 5, 7 are flow diagrams of procedures in communications systems.

In a specific implementation, the IMG may provide a push to talk feature. Users can interact in walkie-talkie mode using key presses to switch between listening mode and talk mode. FIGS. 4-5 illustrate an example of a push to talk feature. A user 510 indicates that a push to talk session should commence with another user 515 (step 2010). The indication may be or include entry of a vanity code. IMG 520 responds to the interpretation by establishing a voice connection to MS 512 of user 510 and another voice connection to MS 517 of user 515 (step 2015). One or both of the voice connections may rely on conventional mobile call connection technology or may rely on Internet based communications technology such as voice over IP or Internet multicasting, through another IMG such as IMG 550. IMG 520 may refer to a push to talk directory 525 that helps IMG 520 to determine, based on the push to talk indication from user 510, that user 515 is to be included in a push to talk session with user 510 (step 2020). Other users 530 may be included as well, much as three or more walkie-talkie users can share a walkie-talkie channel. Normally each MS is in listen mode (step 2025). When one of the users 510, 515 signals a switch to talk mode (step 2030), e.g., by pressing a handset key or by starting to speak, IMG 520 causes the voice signal from the user to be transmitted to the other users in the session (step 2035), and ignores voice signals from the other users (step 2040) so that only one user can speak at a time. If Internet multicasting is used, the voice signal from the user is distributed in packets through the Internet to corresponding IMGs. When the user signals a reversion to listen mode (step 2045), e.g., by pressing a handset key or remaining quiet for a period, IMG 520 halts transmission of the voice signal (step 2050). If a user 510 indicates that the push to talk session should terminate (step 2055), e.g., by entering a vanity code, IMG 520 closes the voice connections (step 2060), which leaves the MSs in conventional standby mode.

A push to talk session may proceed as follows. The user serving as initiator presses one or more function keys on the user's MS, which is detected by the IMG. The IMG refers to a database to determine the participants in the PTT session. A message is transmitted to determine the status of the participants and to identify a serving IMG for each participant. Each serving IMG sets up a call to its corresponding participants. A multiple party session (e.g., including a multicast session or multiple unicast sessions) is set up among the IMGs. Voice input from the initiator is packetized and sent to all IMGs in the multiple party session. Based on the packetized voice input, each IMG sends voice to all of its corresponding participants. The IMG for the initiator serves as the master IMG for the multiple party session. Other users desiring to speak send a request to the master IMG which selects the next user to speak. The user selected to speak is sent an audible signal. When silence is not followed by a request to speak within a specified period of time (e.g., 30 seconds), the session is terminated.

In the same or another specific implementation, the IMG may provide instant voice messaging. A voice instant messaging session may have the following characteristics. A valid subscriber defines a VIM GROUP (VG). At any time, the subscriber can call a predetermined telephone number and record a voice message associated with a pre-defined VG. The system automatically dials out to the members of the VG and plays out the recorded message. Upon receipt of the message the recipient is informed of the identity of the sending party, at which time the recipient can choose to accept or ignore the message.

Subscriber creation of VIM groups can be managed in any of multiple different ways. For example, a VIM Group may be defined via a Web interface where a subscriber can create and manage the subscriber's VGs, via a manual approach wherein the subscriber calls a service that sets up the VG for the subscriber, or via an automatic approach wherein the system presents the subscriber with voice prompts instructing the subscriber regarding how to enter the needed information.

Recording the VIM message can be managed as follows. To record the message to be played out, the subscriber calls the pre-defined VIM telephone number and is instructed to start recording the message. The subscriber may be allotted a maximum message duration, such as 30 seconds for each VIM. When the subscriber is finished recording the message, the sender hangs up, and the IMG automatically plays out the message to the VIM Group.

The playing of VIM messages to VIM Group members can be managed as follows. Once the subscriber has recorded the message, the IMG automatically plays out the message to the users associated with the VIM Group. To do so, the IMG places the outbound calls, determines when the VIM can be played out, and saves the success or failure of the attempt to play out the message to each member of the VG.

The results of playing out the recorded message are stored on the system, e.g., for a predetermined period of time, so that the originator of the message can call back into the system to review the results.

With respect to receiving voice messages, the IMG plays out the voice message for each VIM Group member who decides to accept the message. The recipient can be notified of VIM messages by distinctive ringing or by a visual indication.

Figure 6:
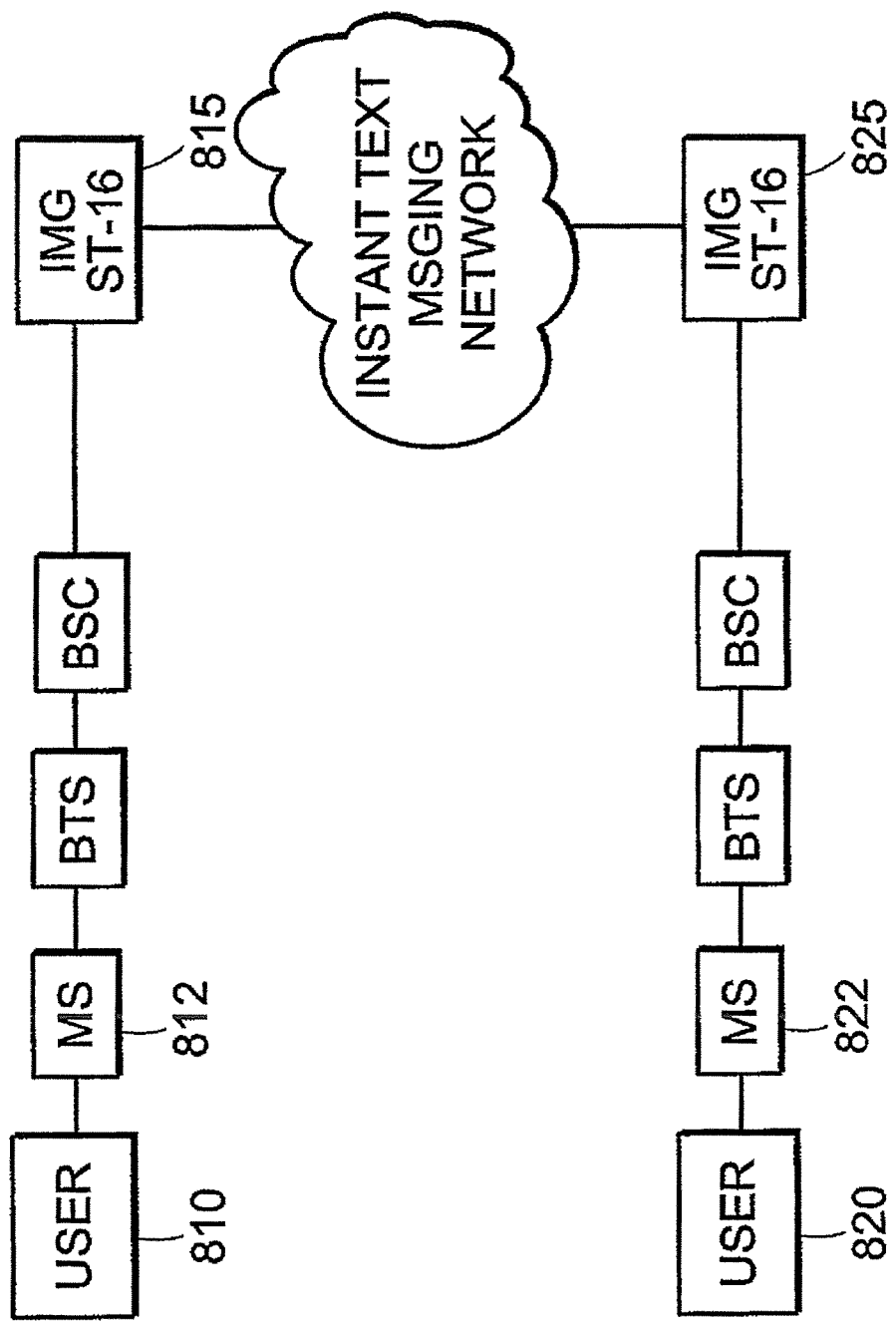
Figure 7:
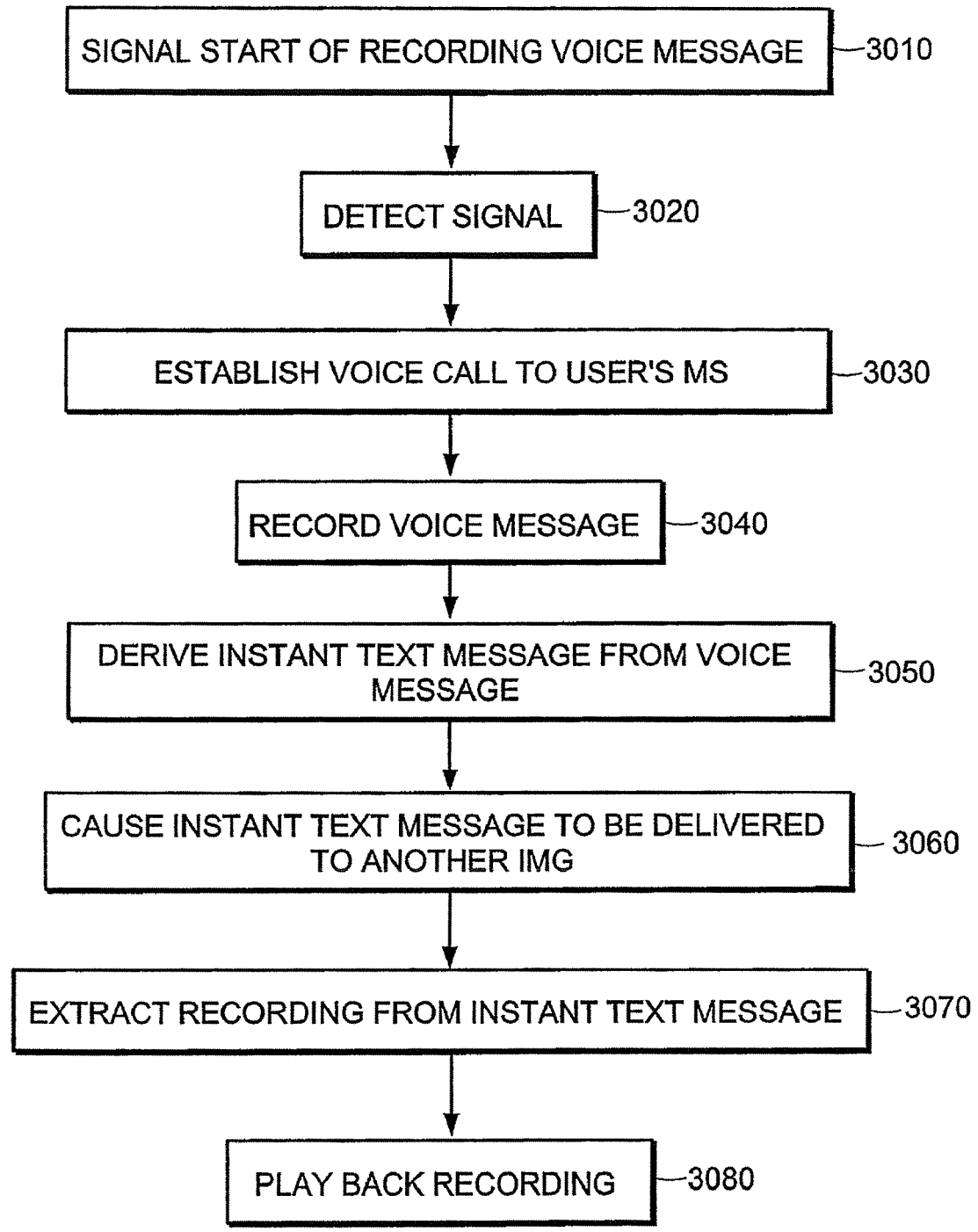

In a particular variant of the instant voice messaging system, users can interact by sending each other instant recorded voice messages that are carried as instant text messages and are played back on the users' conventional MSs. FIGS. 6-7 illustrate an example of instant voice messaging. A user 810 signals the start of recording a voice message (step 3010), e.g., by entering a vanity code. IMG 815 detects the user's signal (step 3020) and establishes a voice call to MS 812 of user 810 (step 3030). IMG 815 records the user's voice message (step 3040) and derives, from the recording, an instant messaging (IM) message suitable for transmission using the instant text messaging capability of the network (step 3050). The user identifies a destination user 820 having an MS 822, e.g., by MS keypad entry, and IMG 815 causes the IM message to be delivered to another IMG 825 corresponding to the other MS 822 (step 3060). IMG 825 extracts the recording from the IM message (step 3070) and plays the recording back on MS 822 for user 820 (step 3080).

In a specific implementation, voice data is converted back and forth between TDM and packets in the instant text messaging format as follows. Bits that are received from a TDM circuit are accumulated for a specified period of time (e.g., 30 seconds) and one or more packets are built from the bits for distribution to all of the participants of the IM session.

IMG 815 may provide a voice command and helper to user 810 that supplies, in voice menu form, much or all of the options that are available to users of instant text messaging. IMG 815 handles incoming and outgoing voice information on the A2 (voice) interface for communicating with MS 812. The voice data is inserted in and extracted from IP packets that are handled by the existing instant text messaging infrastructure.

Each IMG involved in the instant voice messaging serves as an instant text messaging terminus in the existing text messaging infrastructure. In a specific implementation, IMG 815 inserts voice message identification data in IP packets indicating that the instant message represents a voice instant message. On the receiving end, IMG 825 reviews incoming IP packets for instant messages for voice identification data, to recognize the instant messages that represent voice instant messages.

Using the existing instant text messaging infrastructure facilitates the deployment and execution of the instant voice messaging feature. In at least some cases, the IM message is carried by the existing instant text messaging infrastructure in the same or nearly the same way that an instant text message is carried by the infrastructure. The voice data in the recording may be represented in the IM message in a form that eases handling by the existing instant text messaging infrastructure.

For example, a binary to text encoding procedure such as Base64 may be applied to the voice data. Base64 encoding transforms binary data to American Standard Code for Information Interchange (ASCII) text, which can be transported in email or text messaging as any ASCII text is transported. Base64 decoding is performed at the recipient's end to rebuild the binary data. In a two-step procedure, Base64 encoding takes three bytes, each consisting of eight bits, and represents the three bytes as four printable characters in the ASCII standard. In the first step, the three bytes are converted to four numbers of six bits each. Each character in the ASCII standard consists of seven bits. Base64 only uses 6 bits, corresponding to $2^6=64$ characters, to help ensure that encoded data is humanly readable. None of the special characters available in ASCII are used. The 64 characters (hence the name Base64) are 10 digits, 26 lowercase characters, 26 uppercase characters, and '+' and '/'.

If, for example, the three bytes are 155, 162 and 233, the corresponding bit stream is 100110 111010 001011 101001, which in turn corresponds to the 6-bit values 38, 58, 11 and 41.

These numbers are converted to ASCII characters in the second step using a Base64 encoding table. The 6-bit values of the example translate to the ASCII sequence "m6Lp".

The two-step procedure is applied to the whole sequence of bytes that are encoded. To help ensure that the encoded data does not exceed any mail server's line length limit, newline characters are inserted to prevent line lengths from exceeding 75 characters. The newline characters are encoded as any other data.

In at least some cases, it may be necessary or helpful for instant text messaging providers to increase the capacity of the instant text messaging infrastructure to handle increased data traffic and data storage use resulting from instant voice messaging.

On the receiving end, IMG 825 may provide access to the incoming instant voice messages much as access is provided to conventional telephone voice mail. If an incoming instant message is recognized as a voice instant message, IMG 825 extracts the voice data from the instant message, derives a voice mail message from the voice data, and brings the voice mail message to the attention of the receiving user, e.g., by placing a voice call to the user or causing a voice mail indication to be applied to the user's MS.

When a telephone call is directed to an MS while the MS is interacting with the IMG, the Softswitch may cause the call to be intercepted and may cause a response to be issued on behalf of the MS representing the MS as being busy or otherwise unavailable.

In a specific implementation, the IMG has at least 500 megabytes, and possibly up to seven gigabytes, of memory having an access time suitable for voice playback. Instant voice messages can be stored in the memory. The IMG may begin setting up a voice call to the corresponding MS, and may begin playing back a voice message from the memory, before all of the IP packets for the voice message are received into the memory.

Voice recognition software such as voice to text software from SpeechWorks International, Inc. may be used to allow the user to interact with the instant voice messaging system. For example, voice recognition technology used by the IMG, Softswitch related computing facilities, and/or MS may be provided to allow the user to use a voice command to enter an instant voice messaging mode. In such a case, for example, the user may speak a command such as "send instant voice message" into the MS, and the IMG may respond with a voice menu. In another example, the voice recognition software may allow the user to respond to a received instant voice message by speaking "no response", "forward to", "reply", or "save". In any case, the system may allow the user to use keypad buttons instead of or in addition to the voice interaction.

Voice recognition software may be used to allow instant messaging utilizing voice/text conversion, such as instant messaging between an MS and a text messaging device. Text data suitable for transmission over an instant text messaging network may be derived, using voice recognition software, from an audio signal originating at an MS. A destination for the text data may be determined based on an indication from the MS. The text data may be carried on the instant text messaging network toward the destination. Each of the destinations includes real-time communications apparatus for use in real-time communications sessions. The instant messaging utilizing voice/text conversion relies on the destinations and all of the reliance may be only on the real-time communications apparatus. (In the reverse direction, an instant text message, e.g., originating from a text messaging device, may be converted for voice playback, e.g., on an MS, using one or more well known text to voice conversion techniques.)

The system can handle exception cases. For example, if an intended recipient MS is unavailable to receive an instant voice message, the message is stored in a system mailbox on a system server for future delivery. In such a case, a "message waiting" indication such as an audible alert may be provided to the MS at the next suitable opportunity, and the user may be permitted to retrieve the stored instant voice message for playback.

In a case in which the instant voice messaging system is based on an existing instant text messaging system, additional data storage capacity may be added to the existing system (commensurate with the increased data storage use associated with voice messages (which may consume, e.g., 8 kilobytes of storage per second).

In a specific implementation, the data packet or packets that make up the instant voice message include data that is unchanged or substantially unchanged from the TDM data that is received from the BSC. For example, the TDM data may be broken up into packets (e.g., of 1500 bytes), and the TDM data may be delivered much as voice over IP data is delivered.

The Softswitch may be altered or enhanced to suit the instant messaging function. For example, the Softswitch may handle one or more of the functions attributed above to the IMG.

The IMG may be implemented in an enhanced BSC, or the IMG may be enhanced to serve as a BSC. The instant voice message may be delivered via an alternative IP network or via the circuit switched network.

A primary feature of the voice instant messaging application provides a telephone user with the ability to record a voice message and then have the recorded message automatically played out to a pre-defined group of other telephone users. In other features, other forms of media are included, so that a recorded message can be sent to a user or set of users who are not necessarily connected via a mobile or landline handset or other telephonic device. In such a case, the users may be logged onto a computer in which they are connected through a conventional instant messaging chat group.

In either case, recorded messages are delivered to the recipient instead of the recipient having to retrieve the messages.

Figure 8:
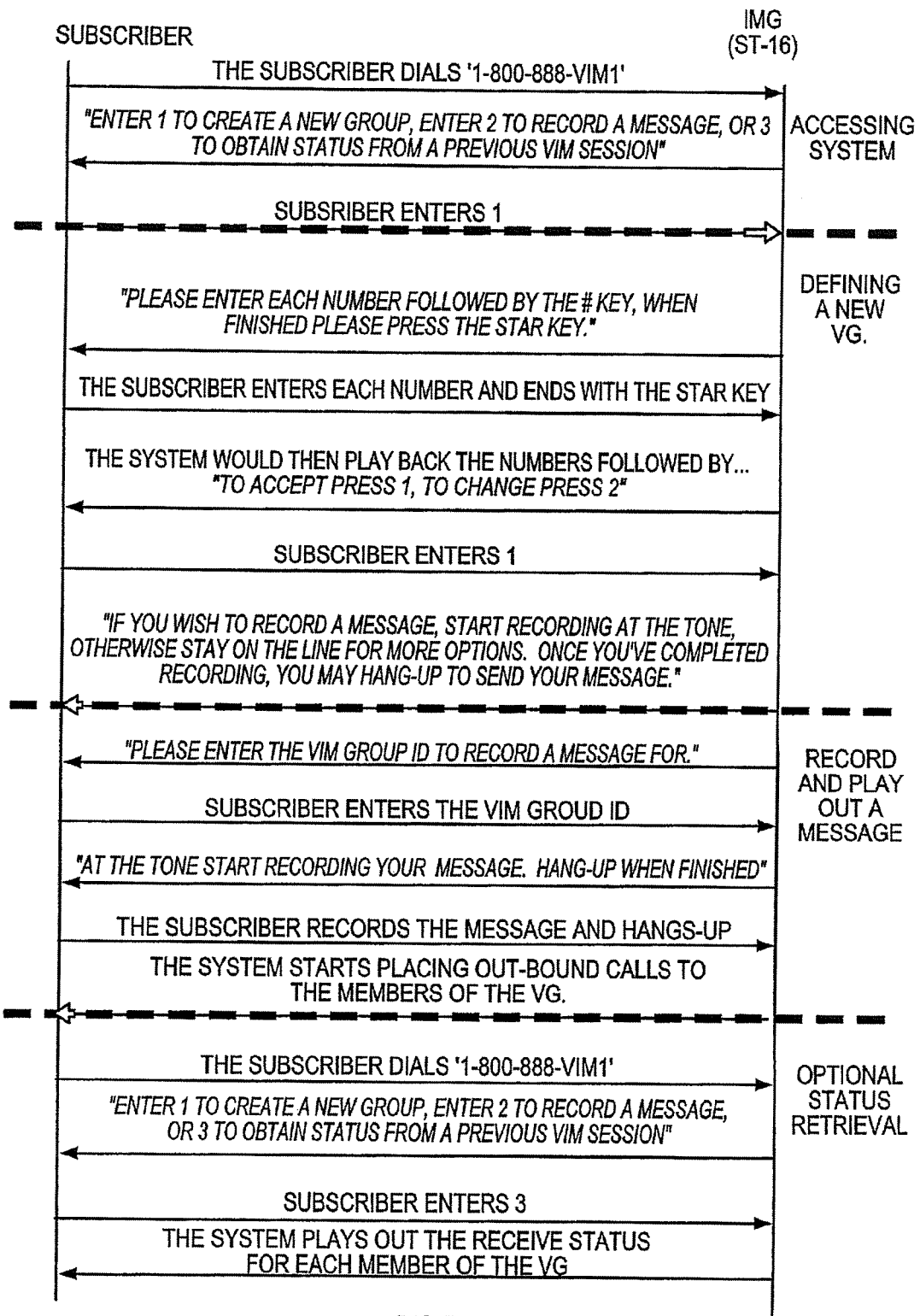
FIGS. 8, 12 are call flow diagrams of sequences in communications systems.

FIG. 8 illustrates a message flow for an example session of user interaction with the Voice Instant Messaging application. In the example session, an automatic approach is used for defining the VIM Group. (As described below, the group definition procedure need not always be performed as the first step, and may be skipped, such as when a group has already been defined.) A subscriber of the VIM service calls into the IMG and requests that a new VIM Group be created. After the VIM Group had been created, the subscriber is asked whether a VIM message is to be created. The subscriber creates a VIM message, which is sent to the members of the newly created VIM group.

If the subscriber wishes to send a message to an already pre-defined VIM group, the subscriber by-passes the "Defining a new VG" section to go directly to the "Record and Play Out A Message" section.

Depending upon the phone numbers defined in the VIM Group, the system can place the out-bound calls using the IP infrastructure or the PSTN.

Figure 9:
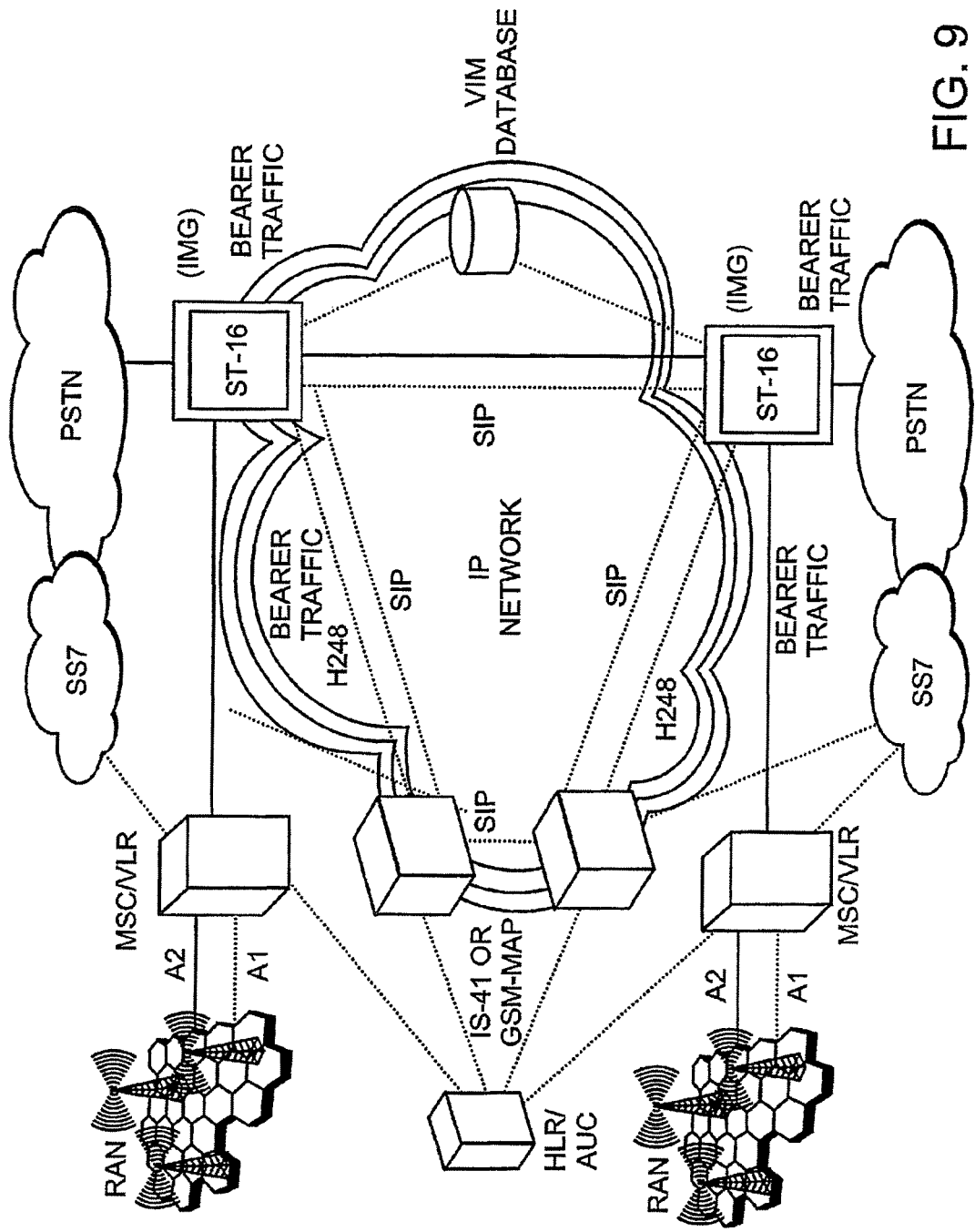

FIG. 9 illustrates a VIM application gateway MSC model. VIM application methods are executed by the IMG. FIG. 9 omits Operations, Administration, Maintenance and Provisioning (OAM&P) and billing network elements and interfaces for simplicity. The IMG uses Session Initiation Protocol (SIP) in conjunction with Megaco/H.248, which is a protocol for control of elements in a physically decomposed multimedia gateway, enabling separation of call control from media conversion. SIP provides the IMG with the ability to generate the outgoing calls via SIP Invite messages to the Softswitch and to other IMGs for each member of the VIM group. Megaco/H.248 allows the Softswitch's media gateway control function to manage bearer trunks on the IMG and provide circuit to packet control for tandem operation.

Figure 10:
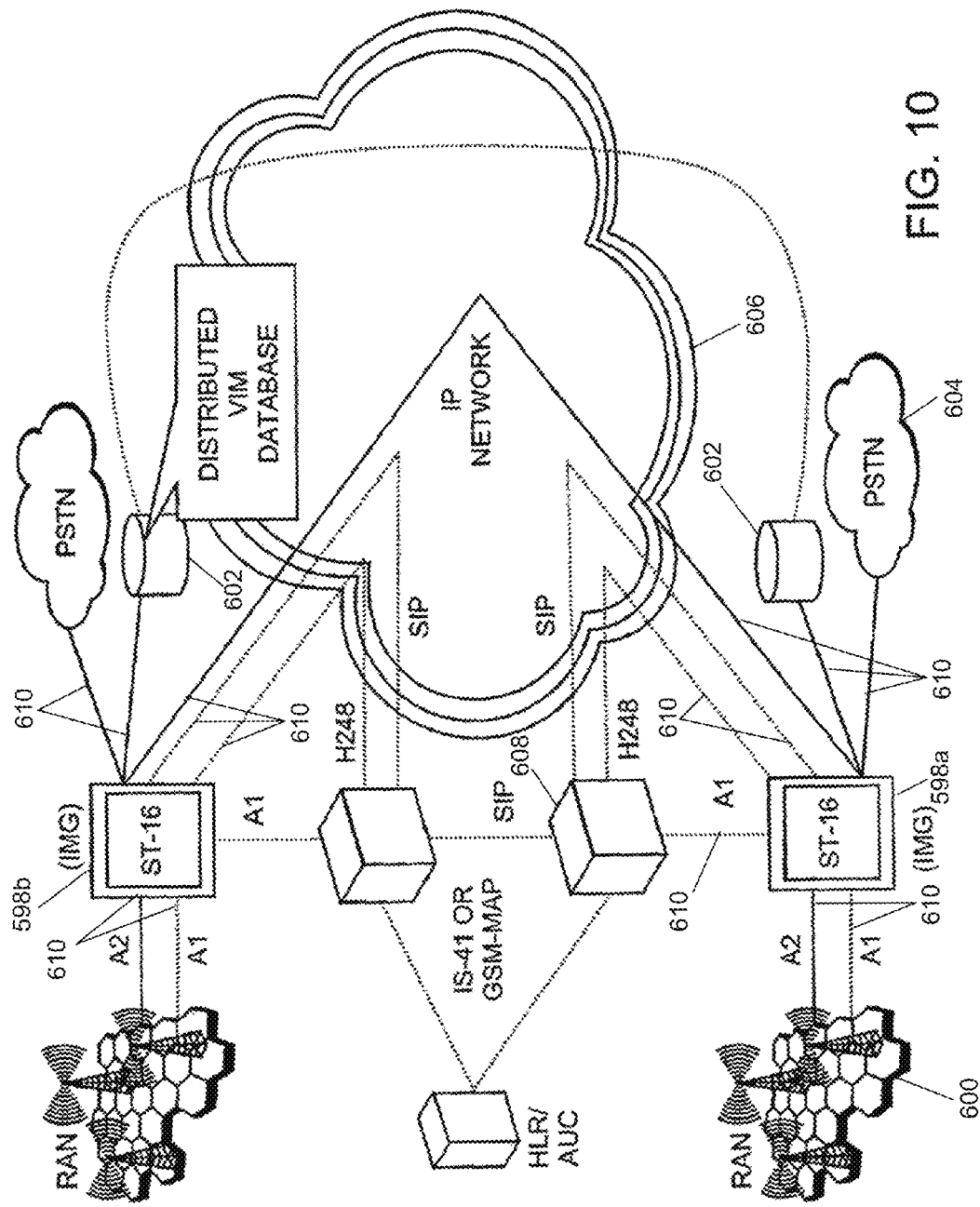

FIG. 10 illustrates a VIM application service MSC model. FIG. 10 includes an IMG 598 that communicates with RAN 600, distributed VIM database 602, PSTN 604, and IP network 606 using connections with the network 610. Again, VIM application methods are executed by the IMG, and OAM&P and billing network elements and interfaces are omitted for simplicity.

Figure 11:
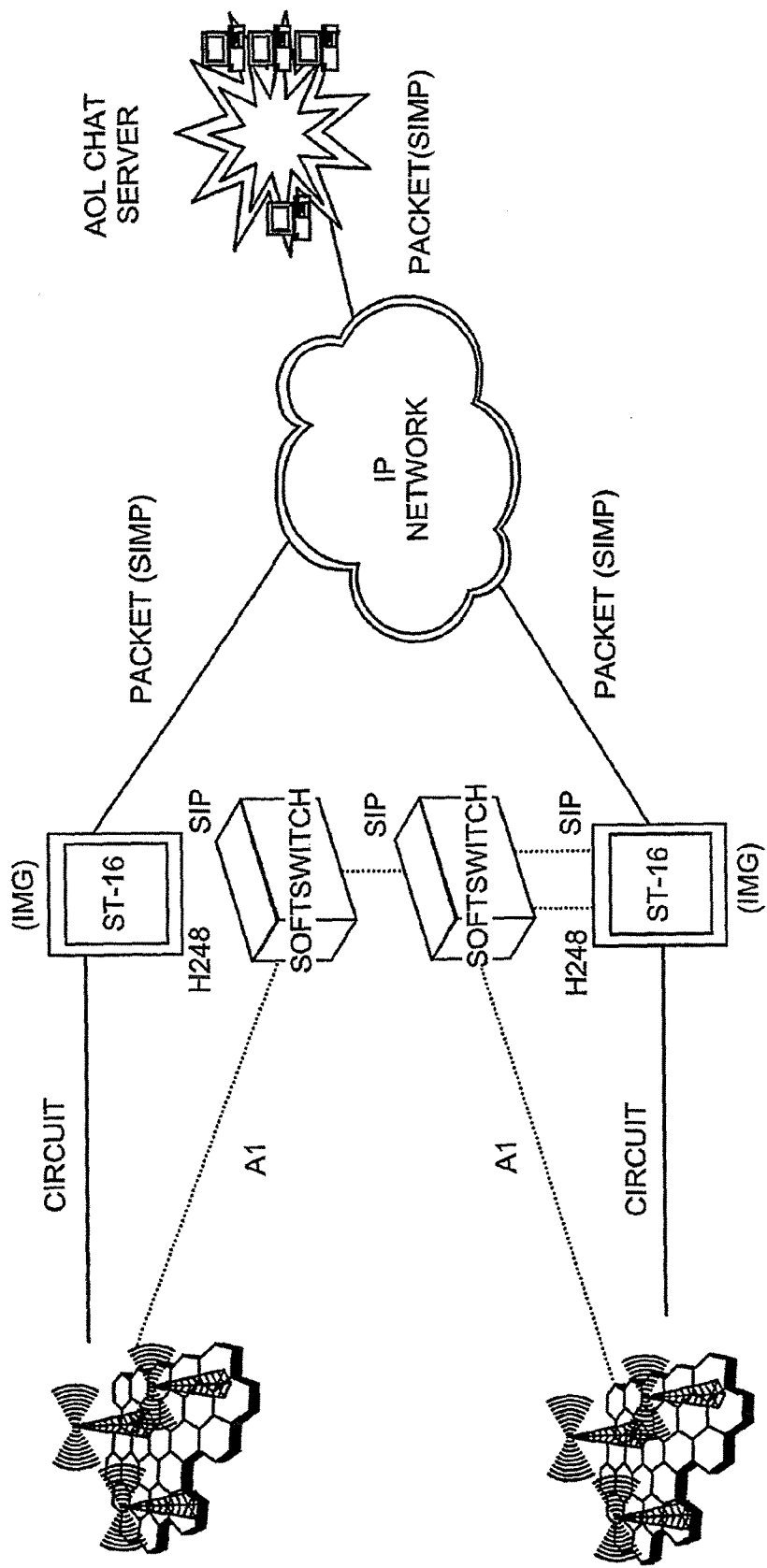

As shown in FIG. 11, VIM methods can be used in conjunction with AOL such that AOL provides the presence and location/routing of VIM messages. Effective deployment of this service relies on the IMG in conjunction with a Softswitch to be deployed in a serving MSC configuration. When the Softswitch recognizes a VIM subscriber within its controlling radio access network (RAN), the Softswitch informs the IMG to create an AOL chat client instance for that subscriber. The AOL chat client created by the IMG connects to the AOL chat server and retrieves the presence information of other members of the VIM group. The AOL chat client also passes its location information to the AOL chat server in a SIMP synchronization procedure.

If a subscriber of the VIM group calls into the VIM service, the IMG records the VIM message in a G.711 format and tunnels the recorded message using Secure Instant Messaging Protocol (SIMP) through the AOL chat server. G.711 is an international standard for encoding telephone audio on a 64 kbps channel. The AOL chat server notifies the participating clients that a message has arrived. The clients, proxied by the IMG, then retrieve the stored message.

The IMG then places an out-bound call to the VIM client through the Softswitch using SIP. Upon the connection to the mobile or landline phone, the IMG plays out the message on the corresponding circuit interface.

A client may be a desktop computer. In this scenario, when the recorded message is sent to the desktop client, the client invokes a multimedia application such as RealPlayer from RealNetworks, Inc. to play out the recording. The desktop may also be configured to convert the recorded message from speech to text. In the other direction, i.e., where a desktop client is sending a message to a mobile subscriber, the IMG may perform a text-to-speech conversion on the message.

Figure 12:
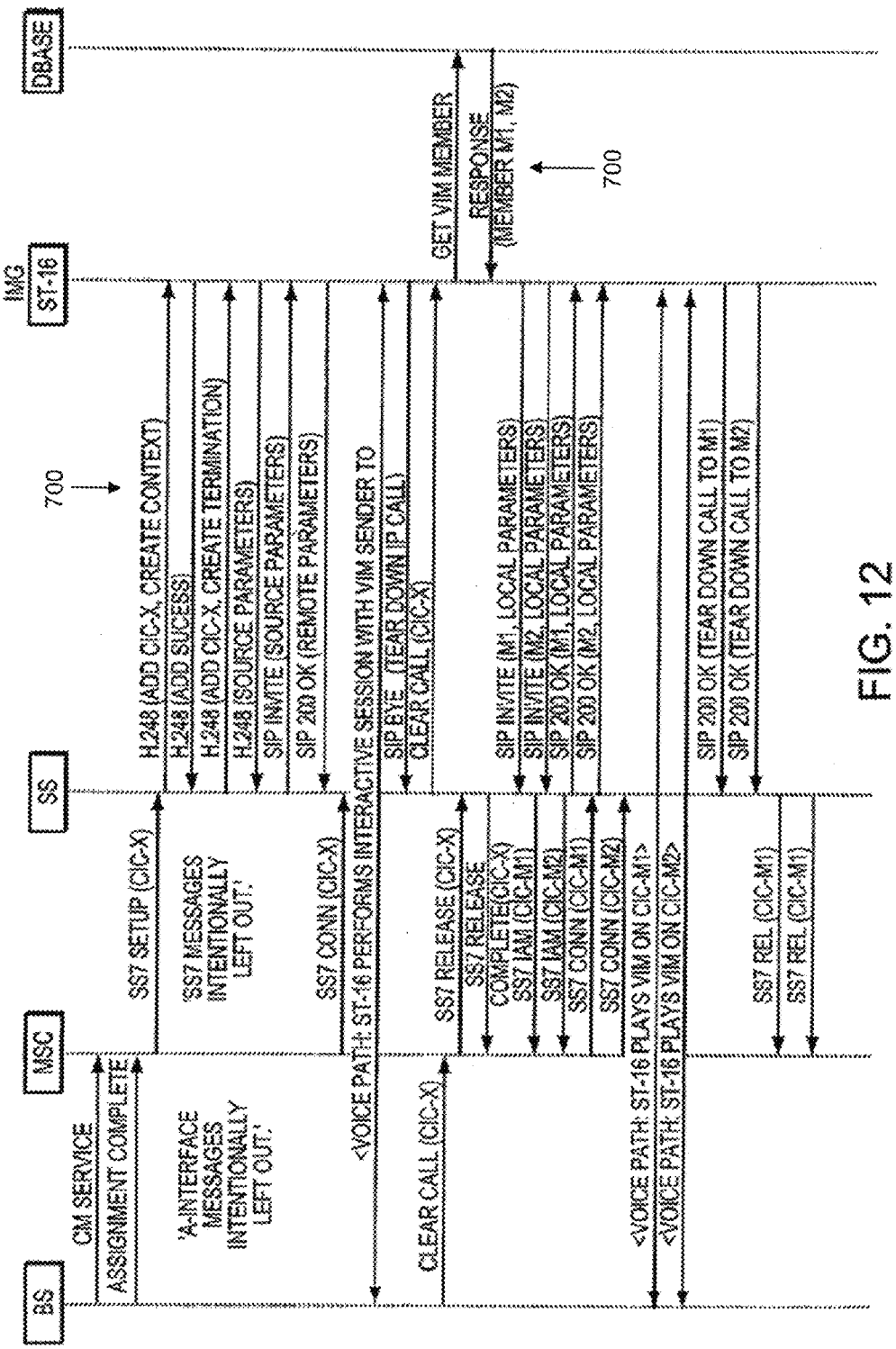

FIG. 12 illustrates a call flow diagram describing external protocol 700 interaction used to support the VIM application described in the MSC gateway scenario. The call flow that is described focuses on the IMG to Softswitch interface and is directed to the Softswitch supporting SS7 to SIP inter-working and Megaco/H.248 gateway control protocol.

The call flow diagram shows the use of SIP to initiate multiple two party calls to the Softswitch. The Softswitch then establishes communication with the MSC via SS7. This call flow shows all VIM application calls being controlled by the single IMG. Although the call flow described assumes that the VIM group can be handled on a single IMG, multiple IMGs may be used with (voice over IP) VoIP bearer between them (not shown for simplicity).

A location service may be provided by the Softswitch to make location requests to the HLR to determine where VIM subscriber's group members are located. The procedure may also include interactions with a billing system via Call Detail Records (CDR) or Radius.

A data capable MS (e.g., based on 2.5G or 3G wireless technology) having packet data communication capabilities or other data communication capabilities may serve as a data terminal. For example, the data capable MS may communicate with the IMG via the IP network and may transmit digitized voice to and/or receive digitized voice from the IMG via the IP network. In another example, the data capable MS may transmit and/or receive voice information formatted to be carried as data over the A5 interface.

In a specific embodiment, a recipient of a VIM may have one or more options for handling the VIM in addition to or instead of playing back the VIM, such as saving, replying to, or forwarding the VIM.

In the case of saving, the recipient can direct (e.g., by telephone key entry or voice command, optionally via a voice menu) that the VIM be saved in the VIM system (e.g., on a hard disk in the system) for playback at a later time. Each user of the VIM system may have an account in the VIM system that allows the user to, among other things, gain access to saved messages including saved VIMs.

In the case of replying, the recipient can direct (e.g., by telephone key entry or voice command, optionally via a voice menu) that a new VIM be created for sending back to the sender of the original VIM (termed a "reply" action), and optionally to the other recipients of the original VIM as well (termed a "reply to all" action). Depending on the specific implementation, the new VIM may optionally include or attach the original VIM. The intended recipient or recipients of the new VIM are automatically selected, being the sender and/or other recipients of the original VIM.

In the case of forwarding, the recipient can direct (e.g., by telephone key entry or voice command, optionally via a voice menu) that a new VIM be created that includes or attaches the original VIM, for sending much as a typical new VIM to one or more designated VIM recipients.

In one or more cases of saving, replying, and/or forwarding, a new non-voice message (e.g., a text instant message) can be created and sent instead of or in addition to a new VIM, e.g., from a computer or message-capable telephone. In cases in which a new VIM is used, the voice content of the new VIM may be recorded through the recipient's telephone.

In a specific embodiment as now described, the user (e.g., VIM recipient) may be permitted to press a key at any time to receive automated instructions including prompts informing the user which commands can be used at that moment. To interrupt a prompt, the user can press key, causing the system to stop the prompt and respond to the request.

As long as at least one recipient designation has been made, the user can hang up to finish.

After logging on, the user can retrieve saved messages by entering a mailbox number, followed by a delimiter key (e.g., "#"), and then entering a password, followed by the delimiter key.

The VIM system may provides information about the saved VIMs, including one or more of the following: the VIM's number, the status of the VIM, an identification of the source of the VIM, the source's phone number, and the date and time the saved VIM was received.

While listening to a VIM, the user may be able to pause playback by pressing a key such as "#" and, optionally after a voice confirmation or prompt, to resume playback of the message by pressing a key such as "#". Key presses may also be used to cause playback of the VIM to be skipped forward or backward, e.g., by a variable or fixed amount such as 10 seconds.

With respect to saved VIMs, key presses may be used to advance to the VIM or move back to a previous VIM. Key presses, e.g., a sequence, may be used to delete a saved VIM.

The VIM system may be configured to provide the sender with an acknowledgement (e.g., an audible signal) when the VIM has been played back by one or more recipients.

The VIM system may allow the sender to identify or designate one or more recipients by spelling out the one or more recipients' names using the telephone keypad.

In one or more specific implementations, an indicator of the sender's identity (e.g., name or pseudonym) may be associated with (e.g., pre-pended to) a VIM. In at least some cases, such an association may allow the sender to be identified to the recipient before the VIM is played back for the recipient, and/or may allow the recipient to apply special treatment to the VIM. For example, the association may allow the recipient's equipment to selectively emphasize the VIM to the recipient, e.g., by signaling with a sensory signal such as a vibration or an audible signal such as a beep, and/or to apply a filter to screen out and prevent playback of the VIM if the sender is blocked or if the sender does not belong to a set of permissible senders, e.g., as designated by the recipient user.

In one or more specific implementations, a VIM may be part of a VIM session in which, once a user is in communication with the VIM system and has made one or more selections in the VIM system, at least one of the one or more selections may be retained and used to allow the user to send and receive VIMs in the VIM session, e.g., in the manner of a chat session or a conversation. For example, in the session, the user may be able to send subsequent VIMs without having to designate recipients, since the recipient designations made at the beginning of the session are re-used. In particular, the participants in the session may be able to reply as described above. As a result, other sessions may be derived from the original session as child sessions or child threads of the original session. In at least some implementations, participant information and other session state information may be tracked and/or retained, e.g., so that a session that is suspended may be re-started at a later time.

The IMG may be or include the Starent ST-16 Intelligent Mobile Gateway platform from Starent Networks Corporation. The IMG may use a digital signal processor (DSP) such as a DSP product from Texas Instruments Incorporated to handle incoming or outgoing voice information. The Softswitch may be or include a TELOS Technology Softswitch powered by Sun Microsystems Netra equipment that may support and direct the actions of one or more IMGs.

The technique (including one or more of the procedures described above) may be implemented in hardware or software, or a combination of both. In at least some cases, it is advantageous if the technique is implemented in computer programs executing on one or more programmable computers, such as a system using a network processor solution from SiByte, Inc., a general purpose computer, or a computer running or able to run Microsoft Windows 95, 98, 2000, Millennium Edition, NT, XP; Unix; Linux; or MacOS; that each include a processor such as an Intel Pentium 4, a storage medium readable by the processor (including volatile and non-volatile memory and/or storage elements), at least one input device such as a keyboard or a voice input device (which may include a microphone), and at least one output device. Program code is applied to data entered using the input device to perform the method described above and to generate output information. The output information is applied to one or more output devices such as a display screen of the computer.

In at least some cases, it is advantageous if each program is implemented in a high level procedural or object-oriented programming language such as C, C++, Java, or Perl to communicate with a computer system. However, the programs can be implemented in assembly or machine language, if desired. In any case, the language may be a compiled or interpreted language.

In at least some cases, it is advantageous if each such computer program is stored on a storage medium or device, such as ROM or magnetic diskette, that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, an undeliverable or otherwise exceptional instant voice message may be diverted into a temporary voice mailbox so that an intended recipient can play back the message at a later time.

We claim:

1. A method for enabling a first mobile station to interact via a multi-party mobile communication session with at least one second mobile station using circuit-switched voice communication capabilities of the first mobile station and the at least one second mobile stations, the method comprising:

establishing, at a first mobile gateway platform, upon detecting a request from a first mobile station that a multi-party communication session be commenced with at least one second mobile station, a first circuit-switched voice call connection with the first mobile station via a base station in a radio access network (RAN);

communicating, at the first mobile gateway platform, with a database to obtain information regarding the at least one second mobile station including an identity of one or more second mobile gateway platforms respectively serving the at least one second mobile station;

establishing, at the first mobile gateway platform, the multi-party communication session with the one or more second mobile gateway platforms, wherein each second mobile gateway platform, upon completion of the establishing of the multi-party communication session with the first mobile gateway platform, establishes a second circuit-switched voice call connection with the corresponding second mobile station;

packetizing, at the first mobile gateway platform, a voice input received from the first mobile station via the first voice call connection; and sending the packetized voice input to each of the one or more second mobile gateway platforms via the multi-party communication session, wherein each second mobile gateway platform, upon receiving the packetized voice input, extracts the voice input and sends the voice input to the corresponding second mobile station via the second voice call connection, wherein the first mobile gateway platform and the one or more second mobile gateway platforms each includes a soft-switch for coordinating pathway setup and wherein the soft-switches communicate with one another through signaling system 7 (SS7) system, wherein the first mobile gateway platform is interposed between a base station controller (BSC) and a mobile switching center (MSC), and wherein the BSC is coupled to the base station in the RAN and the MSC is coupled to public switched telephone network (PSTN) and the SS7 system.

2. The method of claim 1, wherein the first mobile gateway platform includes an Internet Media Gateway (IMG).

3. The method of claim 1, wherein the multi-party communication session is established over the Internet.

4. The method of claim 1, wherein the multi-party communication session includes a multicast push-to-talk session.

5. The method of claim 4, wherein the request from the first mobile station includes a request for multicast push-to-talk session and the multicast push-to-talk session request is generated when one or more function keys on the first mobile station are activated.

6. The method of claim 4, wherein the database includes a push-to-talk (PTT) directory and wherein the PTT directory helps determine, using information contained in the push-to-talk session request, that the at least one second mobile station is to be included in the session.

7. The method of claim 6, wherein the information contained in the push-to-talk session request includes a vanity code.

8. The method of claim 1, wherein the multi-party communication session includes a multicast instant voice messaging session.

9. The method of claim 8, wherein the request from the first mobile station includes a request for a start of recording of voice message and the request is generated when a vanity code is entered on the first mobile station.

10. The method of claim 8, wherein the multicast instant voice messaging session is established over an instant text messaging network, wherein the packetized voice input includes an instant messaging (IM) message derived from the voice input and wherein the IM message is suitable for transmission in the instant text messaging network.

11. An apparatus comprising:
a memory capable of storing data; and
a processor configured for using the data such that the apparatus:
establishes, upon detecting a request from a first mobile station that a multi-party communication session be commenced with at least one second mobile station, a first circuit-switched voice call connection with the first mobile station via a base station in a radio access network (RAN);
communicates with a database to obtain information regarding the at least one second mobile station including an identity of one or more mobile gateway platforms respectively serving the at least one second mobile station;
establishes the multi-party communication session with the one or more mobile gateway platforms, wherein each mobile gateway platform, upon completion of the establishing of the multi-party communication session, establishes a second circuit-switched voice call connection with the corresponding second mobile station;
packetizes a voice input received from the first mobile station via the first voice call connection; and
sends the packetized voice input to each of the one or more mobile gateway platforms via the multi-party communication session, wherein each mobile gateway platform, upon receiving the packetized voice input, extracts the voice input and sends the voice input to the corresponding second mobile station via the second voice call connection, wherein the apparatus and the one or more mobile gateway platforms each includes a soft-switch for coordinating pathway setup and wherein the soft-switches communicate with one another through signaling system 7 (SS7) system, wherein the apparatus is interposed between a base station controller (BSC) and a mobile switching center (MSC), and wherein the BSC is coupled to the base station in the RAN and the MSC is coupled to public switched telephone network (PSTN) and the SS7 system.

12. The apparatus of claim 11, wherein the mobile gateway platforms include an Internet Media Gateway (IMG).

13. The apparatus of claim 11, wherein the multi-party communication session includes a multicast push-to-talk session.

14. The apparatus of claim 13, wherein the request from the first mobile station includes a request for multicast push-to-talk session and the multicast push-to-talk session request is generated when one or more function keys on the first mobile station are activated.

15. The apparatus of claim 11, wherein the multi-party communication session includes a multicast instant voice messaging session.

16. The apparatus of claim 15, wherein the packetized voice input includes an instant messaging (IM) message derived from the voice input.

17. A non-transitory computer readable medium having executable instructions operable to cause an apparatus to:
establish, upon detecting a request from a first mobile station that a multi-party communication session be commenced with at least one second mobile station, a first circuit-switched voice call connection with the first mobile station via a base station in a radio access network (RAN);
communicate with a database to obtain information regarding the at least one second mobile station including an identity of one or more mobile gateway platforms respectively serving the at least one second mobile station;
establish the multi-party communication session with the one or more mobile gateway platforms, wherein each mobile gateway platform, upon completion of the establishing of the advanced multi-party communication session, establishes a second circuit-switched voice call connection with the corresponding second mobile station;
packetize a voice input received from the first mobile station via the first voice call connection; and
send the packetized voice input to each of the one or more mobile gateway platforms via the multi-party communication session, wherein each mobile gateway platform, upon receiving the packetized voice input, extracts the voice input and sends the voice input to the corresponding second mobile station via the second voice call connection, wherein the apparatus and the one or more mobile gateway platforms each includes a soft-switch for coordinating pathway setup and wherein the soft-switches communicate with one another through signaling system 7 (SS7) system, wherein the apparatus is interposed between a base station controller (BSC) and a mobile switching center (MSC), and wherein the BSC is coupled to the base station in the RAN and the MSC is coupled to public switched telephone network (PSTN) and the SS7 system.

18. A method for enabling a first mobile station to interact via a multi-party mobile communication session with at least one second mobile station using circuit-switched voice communication capabilities of the first mobile station and the at least one second mobile stations, the method comprising:

establishing, at a first mobile gateway platform, upon detecting a request from a first mobile station that a multi-party communication session be commenced with at least one second mobile station, a first circuit-switched voice call connection with the first mobile station via a base station in a radio access network (RAN);

communicating, at the first mobile gateway platform, with a database to obtain information regarding the at least one second mobile station including an identity of one or more second mobile gateway platforms respectively serving the at least one second mobile station;

establishing, at the first mobile gateway platform, the multi-party communication session with the one or more second mobile gateway platforms, wherein each second mobile gateway platform, upon completion of the establishing of the multi-party communication session with the first mobile gateway platform, establishes a second circuit-switched voice call connection with the corresponding second mobile station;

packetizing, at the first mobile gateway platform, a voice input received from the first mobile station via the first voice call connection; and sending the packetized voice input to each of the one or more second mobile gateway platforms via the multi-party communication session, wherein each second mobile gateway platform, upon receiving the packetized voice input, extracts the voice input and sends the voice input to the corresponding second mobile station via the second voice call connection, wherein the multi-party communication session includes a multicast instant voice messaging session and wherein the request from the first mobile station includes a request for a start of recording of voice message and the request is generated when a vanity code is entered on the first mobile station.

* * * * *